United States Patent
Kakuko et al.

(10) Patent No.: US 10,713,799 B2
(45) Date of Patent: Jul. 14, 2020

(54) INFORMATION PROCESSING APPARATUS, BACKGROUND IMAGE UPDATE METHOD, AND NON-TRANSITORY COMPUTER-READABLE STORAGE MEDIUM

(71) Applicant: FUJITSU LIMITED, Kawasaki-shi, Kanagawa (JP)

(72) Inventors: Norihiro Kakuko, Kawasaki (JP); Shanshan Yu, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 16/185,497

(22) Filed: Nov. 9, 2018

(65) Prior Publication Data
US 2019/0147601 A1    May 16, 2019

(30) Foreign Application Priority Data
Nov. 10, 2017    (JP) .................................. 2017-217768

(51) Int. Cl.
*G06T 7/246*    (2017.01)
*G06T 7/73*    (2017.01)
(Continued)

(52) U.S. Cl.
CPC .............. *G06T 7/248* (2017.01); *G06T 7/215* (2017.01); *G06T 7/74* (2017.01); *G06K 9/00228* (2013.01);
(Continued)

(58) Field of Classification Search
CPC ........... G06T 2207/10016; G06T 7/254; G06T 2207/30201; G06T 7/11
See application file for complete search history.

(56) References Cited

U.S. PATENT DOCUMENTS

| | | | | |
|---|---|---|---|---|
| 5,745,173 A | * | 4/1998 | Edwards | ............ H04N 5/23248 348/143 |
| 7,515,739 B2 | * | 4/2009 | Porter | ................ G06K 9/00228 348/207.99 |

(Continued)

FOREIGN PATENT DOCUMENTS

| | | |
|---|---|---|
| JP | 2003-123074 | 4/2003 |
| JP | 2010-015469 | 1/2010 |
| JP | 2013-152669 | 8/2013 |

OTHER PUBLICATIONS

Chris Stauffer et al.: "Adaptive background mixture models for real-time tracking", Proceeding of the 1999 IEEE Computer Society Conference on Computer Vision and Pattern Recognition, Jun. 23-25, 1999; Fort Collins, Colorado, pp. 246-252, Jan. 1, 1999. Cited in EESR dated Feb. 19, 2019 for corresponding European Patent Application No. 18204867.8.

(Continued)

*Primary Examiner* — Yosef Kassa
(74) *Attorney, Agent, or Firm* — Fujitsu Patent Center

(57) ABSTRACT

An information processing apparatus including a memory, and a processor coupled to the memory and the processor configured to execute a process, the process including extracting a moving object area corresponding to a moving object included in a plurality of frames in a moving image based on a result of a comparison between the plurality of frames with each other, tracking a position of the moving object area among the plurality of frames, determining, for each of the plurality of frames, an image area excluding the moving object area to be a background area whose position moves more than a defined period of time, and updating a background image of the moving image based on a result of the determining.

10 Claims, 16 Drawing Sheets

(51) Int. Cl.
*G06T 7/215* (2017.01)
*G06K 9/00* (2006.01)

(52) U.S. Cl.
CPC ........... *G06T 2207/10016* (2013.01); *G06T 2207/20012* (2013.01); *G06T 2207/20212* (2013.01); *G06T 2207/30232* (2013.01)

(56) References Cited

U.S. PATENT DOCUMENTS

| | | | | |
|---|---|---|---|---|
| 7,706,603 B2* | 4/2010 | Najafi | ................ | G06K 9/3208 345/419 |
| 7,720,283 B2* | 5/2010 | Sun | ................ | G06K 9/38 382/173 |
| 8,244,469 B2* | 8/2012 | Cheung | ................ | G01S 7/003 700/248 |
| 8,311,281 B2* | 11/2012 | Ikeda | ................ | G06K 9/3241 348/135 |
| 9,025,830 B2* | 5/2015 | Ma | ................ | G06K 9/00221 382/107 |
| 2014/0146998 A1 | 5/2014 | Wieser | | |
| 2015/0003675 A1 | 1/2015 | Nakagami | | |
| 2016/0210759 A1 | 7/2016 | Baek et al. | | |

OTHER PUBLICATIONS

Rong-Chi Chang et al,: "Application of Inpainting Technology to Video Restoration", UBI-Media Computing, 2008 First IEEE International Conference, IEEE, Piscataway, NJ, USA, pp. 359-364, Jul. 31, 2008. Cited in EESR dated Feb. 19, 2019 for corresponding European Patent Application No. 18204867.8.

Thierry Bouwmans et al.: "Background Modeling using Mixture of Gaussians for Foreground Detection—A Survey", Recent Patents on Computer Science, vol. 1, No. 3, pp. 219-237, Jan. 9, 2010. Cited in EESR dated Feb. 19, 2019 for corresponding European Patent Application No. 18204867.8.

EESR—Extended European Search Report dated Feb. 19, 2019 for corresponding European Patent Application No. 18204867.8.

* cited by examiner

INFORMATION PROCESSING APPARATUS, BACKGROUND IMAGE UPDATE METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-217768, filed on Nov. 10, 2017, the entire contents of which are incorporated herein by reference.

FIELD

The embodiments discussed herein are related to an information processing apparatus, a background image update method, and a non-transitory computer-readable storage medium.

BACKGROUND

To date, a background difference method is known as a method of detecting a moving object that appears as a foreground from a moving image captured by a camera. In the background difference method, a background image (also referred to as a background model) that does not include an object to be detected is detected from a moving image captured by a camera and is stored. The difference of the background image is obtained from a moving image captured by the camera so that an image area in which a moving object appears is detected.

As a technique for detecting a background image to be used for a background difference method, a technique is known that controls a pixel value of each area in a monitoring image using a predetermined transmittance ratio and updates the pixel value of the area corresponding to a background image in sequence. A technique is known that increases a count value for pixels other than the pixels determined to be in a moving object area and updates the background image data of the pixels having the count value that has reached a predetermined value. A technique is known that determines, as a still area, a portion having a still time that becomes equal to or higher that a predetermined threshold value for determining stillness by counting the number of continuous appearances as a foreground and creating a new background model of an area determined to be a still area.

RELATED ART TECHNICAL DOCUMENT

Patent Literature

[Patent Document 1] Japanese Laid-open Patent Publication No. 2013-152669.
[Patent Document 2] Japanese Laid-open Patent Publication No. 2003-123074.
[Patent Document 3] Japanese Laid-open Patent Publication No. 2010-15469.

SUMMARY

According to an aspect of the embodiments, an information processing apparatus including a memory, and a processor coupled to the memory and the processor configured to execute a process, the process including extracting a moving object area corresponding to a moving object included in a plurality of frames in a moving image based on a result of a comparison between the plurality of frames with each other, tracking a position of the moving object area among the plurality of frames, determining, for each of the plurality of frames, an image area excluding the moving object area to be a background area whose positon moves more than a defined period of time, and updating a background image of the moving image based on a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in the above-described related art, for example, there is a problem in that if a moving object that appears in a moving image captured by a camera stops moving over a certain time period, a background image in which the moving object appears just like a shadow is detected.

According to one aspect, it is an object to suppress detection of a moving object included in a background image.

In the following, descriptions will be given of an information processing apparatus, a background update method, and a background update program according to embodiments with reference to the drawings. In the embodiments, the same signs are given to the component having the same function, and redundant descriptions will be omitted. The information processing apparatus, the background update method, and the background update program described in the following embodiments are only examples and do not limit the embodiments. Each embodiment described below may be suitably combined within a range that does not cause inconsistency.

First Embodiment

Figure 1:
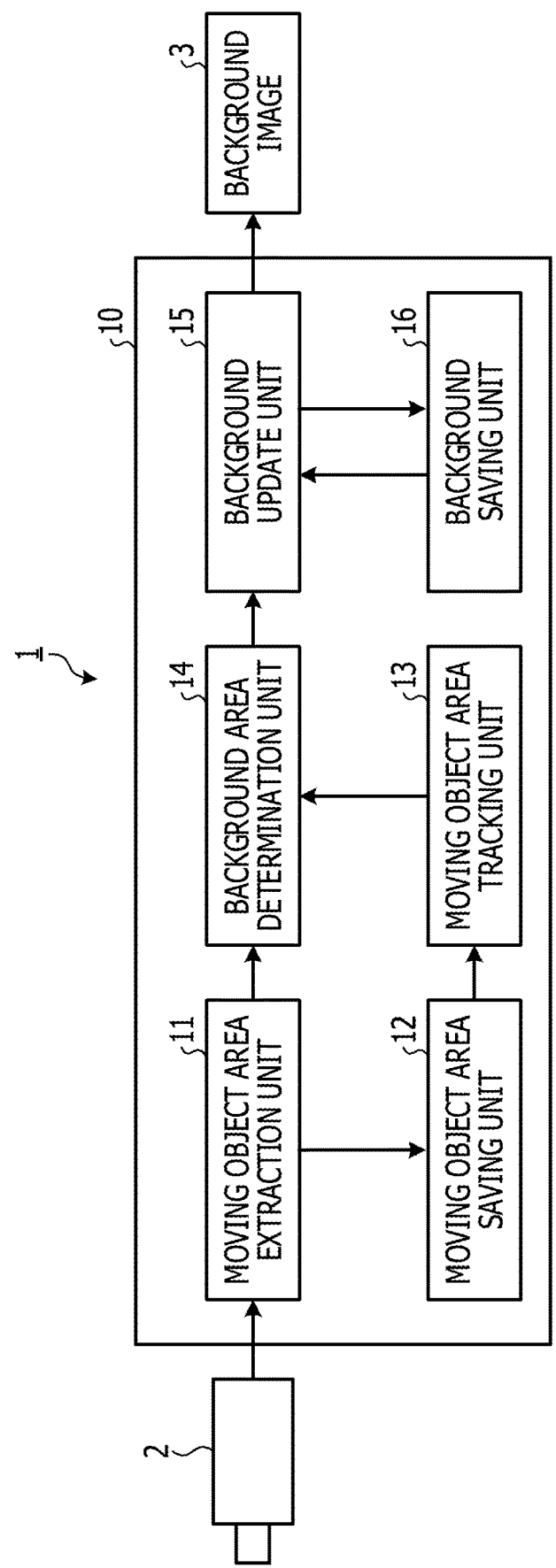
FIG. 1 is a block diagram illustrating an example of the functional configuration of a detection device according to a first embodiment.

FIG. 1 is a block diagram illustrating an example of the functional configuration of a detection device according to a first embodiment. As illustrated in FIG. 1, a moving image captured by a camera 2 is input into a detection device 1. The detection device 1 includes a background detection unit 10 that detects a background image 3 corresponding to the background other than a moving object that appears as a foreground from the input moving image. The detection device 1 is an information processing apparatus that performs image processing on the moving image, and, for example, it is possible to employ a PC (personal computer), a smartphone, a tablet terminal, or the like.

The background image 3 is image data, which is also referred to as a background model, corresponding to a background for detecting an image area, in which a moving object appears, by a background difference method, and, for example, image data indicating pixel values including a brightness value, or the like of each pixel of the image area corresponding to the background. In the background difference method, by obtaining the difference of the background image 3 from the moving image captured by the camera 2, it is possible to detect an image area in which a moving object appears.

The background detection unit 10 includes a moving object area extraction unit 11, a moving object area saving unit 12, a moving object area tracking unit 13, a background area determination unit 14, a background update unit 15, and a background saving unit 16.

The moving object area extraction unit 11 extracts a moving object area which is an image area corresponding to a moving object that appears in each frame based on a comparison result of the preceding and the following frames of the moving image input by the camera 2. That is to say, the moving object area extraction unit 11 is an example of the extraction unit.

The moving object area saving unit 12 saves the moving object area extracted by the moving object area extraction unit 11. Specifically, the moving object area saving unit 12 extracts and saves the pixels in the moving object area extracted by the moving object area extraction unit 11 from a frame.

The moving object area tracking unit 13 refers to the moving object area saved in the moving object area saving unit 12 so as to track the position of the moving object area between the frames based on the correlation between the moving object area extracted by the moving object area extraction unit 11 and each frame of the moving image. That is to say, the moving object area tracking unit 13 is an example of the tracking unit.

The background area determination unit 14 determines a background area of each frame excluding the moving object area extracted by the moving object area extraction unit 11 to be an image area in each frame of the moving image captured by the camera 2. If a moving object area having a position tracked by the moving object area tracking unit 13 is included in a frame, the background area determination unit 14 determines an image area excluding the moving object area to be a background area of each frame. That is to say, the background area determination unit 14 is the example of the determination unit.

Figure 2:
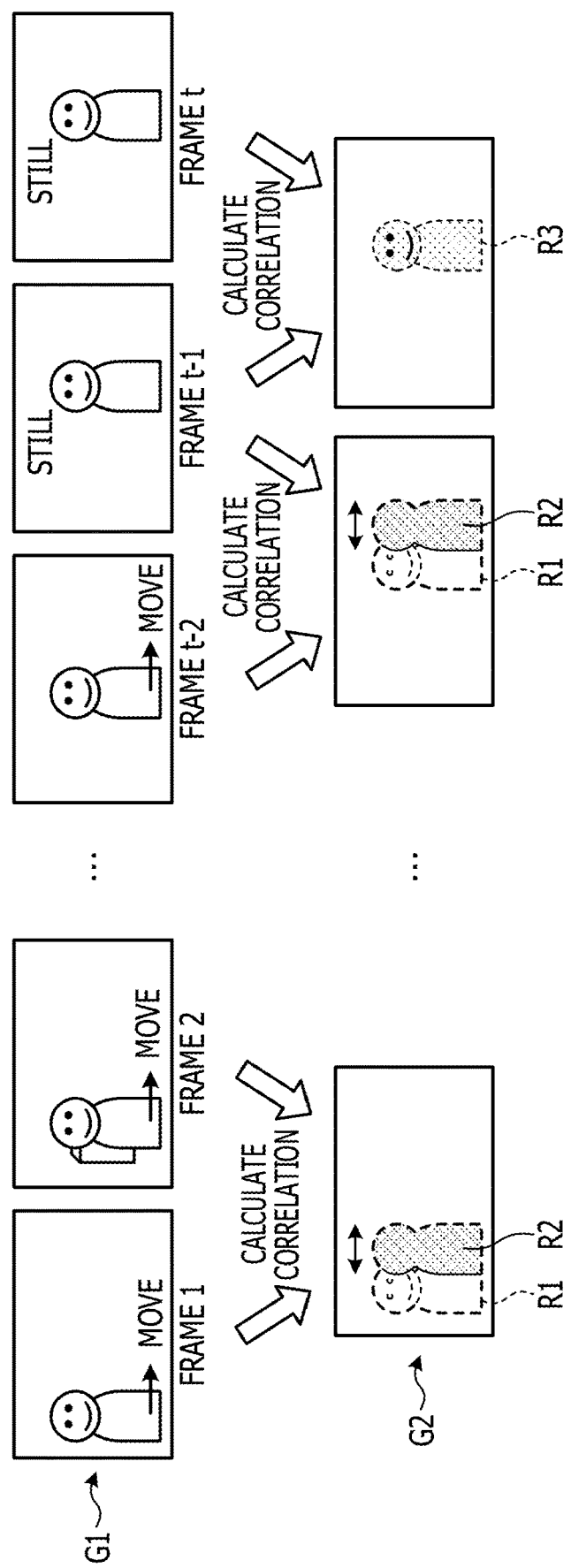
FIG. 2 is an explanatory diagram explaining determination of a background area.

FIG. 2 is an explanatory diagram explaining determination of a background area. In FIG. 2, a moving image G1 is a moving image captured by the camera 2 and input into the background detection unit 10. Correlation information G2 is information obtained by calculating the correlation of the brightness values of the preceding and following frames of the moving image G1.

As illustrated in FIG. 2, if a moving object that is moving in the preceding and the following frames of the moving image G1 is included, the correlation of an area R1 corresponding to the moving object becomes low in the correlation information G2.

Accordingly, the moving object area extraction unit 11 obtains an area R1 having a low correlation as a candidate area including a moving object from the correlation information G2 of the frame to be processed and the preceding frame. The moving object area extraction unit 11 extracts an area R2 having a high correlation in the brightness value with the frame to be processed in the obtained area R1 as a moving object area corresponding to the moving object. Thereby, the background area determination unit 14 determines the image area other than the area R2 extracted correspondingly to the moving object having motion as a background area.

When the moving object stops moving as in "frame t−1" and thereafter, the area R1 having a low correlation is not obtained from the correlation information G2, the moving object area extraction unit 11 does not extract a moving object area.

In order to cope with such stillness of a moving object, the moving object area tracking unit 13 tracks the position of a moving object area among frames based on the correlation between a moving object area saved in the moving object area saving unit 12, that is to say, the area R2 and each frame of the moving image G1. Specifically, the moving object area tracking unit 13 tracks the position having a high correlation with the area R2 in each frame of the moving image G1.

For example, in the example in FIG. 2, although the moving object stands still in the frames of "frame t−1" and thereafter, the moving object area tracking unit 13 tracks the position of an area R3 corresponding to the moving object that has stopped based on the correlation with the area R2 obtained up to the preceding frame. Thereby, when the area R3 of which position has been tracked by the moving object area tracking unit 13 remains in the frame, the background area determination unit 14 determines an image area other than the area R3 as a background area.

The background update unit 15 detects a background image 3 in each frame of the moving image captured by the camera 2 based on the background area in each frame determined by the background area determination unit 14. That is to say, for example, the background update unit 15 is an example of the background detection unit.

Specifically, for example, the background update unit 15 multiplies a pixel value (for example, a brightness value) in the background area of a frame to be processed by a predetermined value based on the background area determined by the background area determination unit 14.

Thereby, the background update unit 15 detects a background image corresponding to the background area from the frame to be processed.

Next, the background update unit 15 reads a background image from the background saving unit 16 that saves background images detected up to the preceding frame of the frame to be processed and adds the background image detected from the frame to be processed. Thereby, the background update unit 15 updates the background image saved by the background saving unit 16 as a background image up to the frame to be processed. Next, the background update unit 15 outputs the updated background image as a background image 3.

Figure 3:
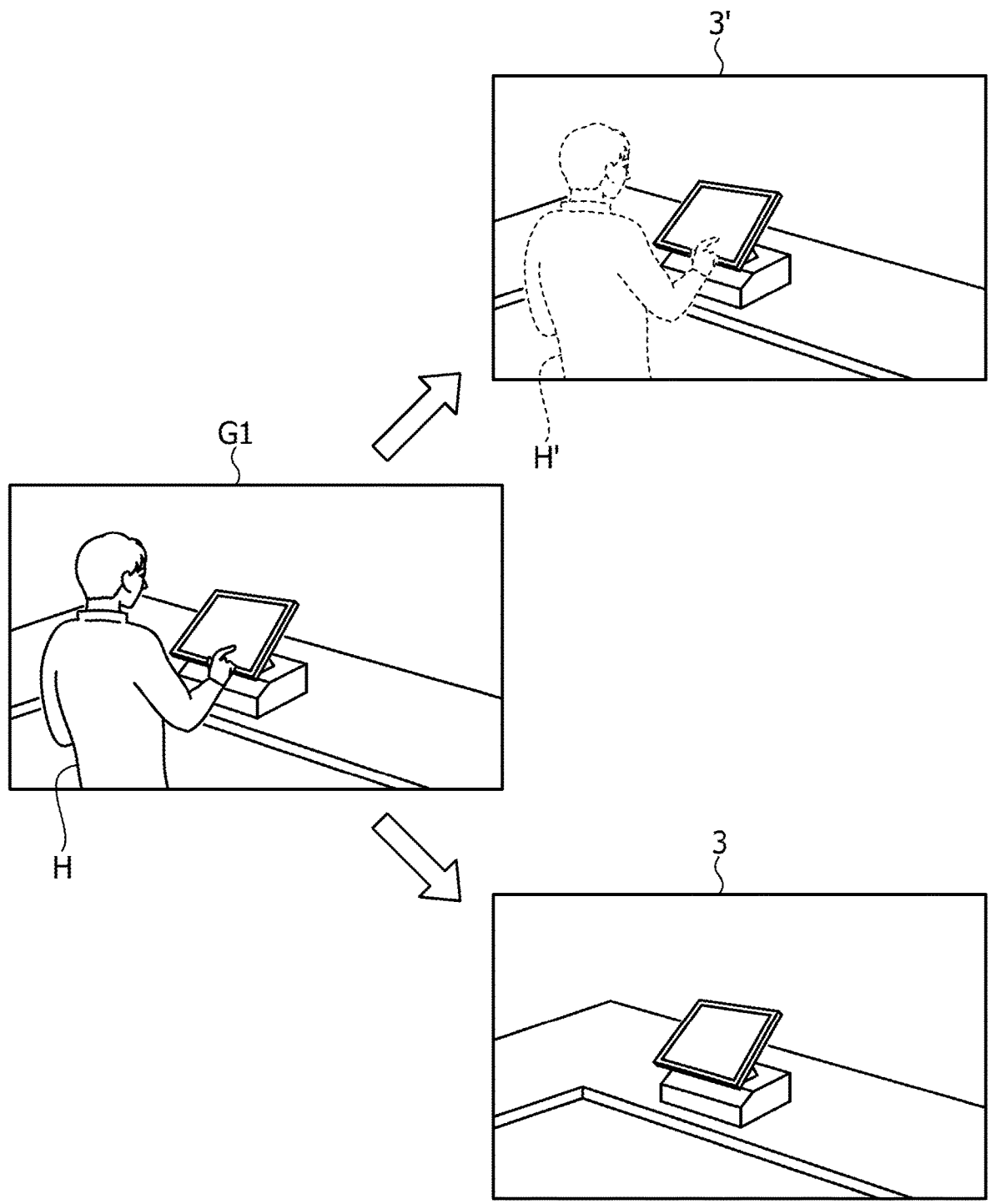
FIG. 3 is an explanatory diagram explaining a background image that has been updated.

FIG. 3 is an explanatory diagram explaining a background image that has been updated. In FIG. 3, a moving image G1 is a scene in which a store employee H who has moved from the outside of a frame works at a cash register. If an image area other than the moving object area extracted by the moving object area extraction unit 11 is determined as a background area, a moving object area is not extracted from the frames in a standstill state and thereafter, and thus a shadow H' corresponding to the store employee H who stopped moving at the cash register is sometimes included in the background image 3'. In this manner, if a background difference method is performed using the background image 3' in which a moving object (store employee H) appears as a shadow, a decrease in the detection precision of a moving object is brought about.

In contrast, when a moving object area of which position has been tracked by the moving object area tracking unit 13 remains in a frame, if an image area other than the moving object area is determined as a background area, an image area other than the store employee H who has stopped in front of the cash register is determined as a background area. Accordingly, it is possible to obtain a background image 3 that does not include the store employee H.

The case where the above-described device 1 is applied to a system that monitors customer reception when a store employee takes care of a customer is exemplified, and a description will be given of the details of the processing performed by the detection device 1.

Figure 4:
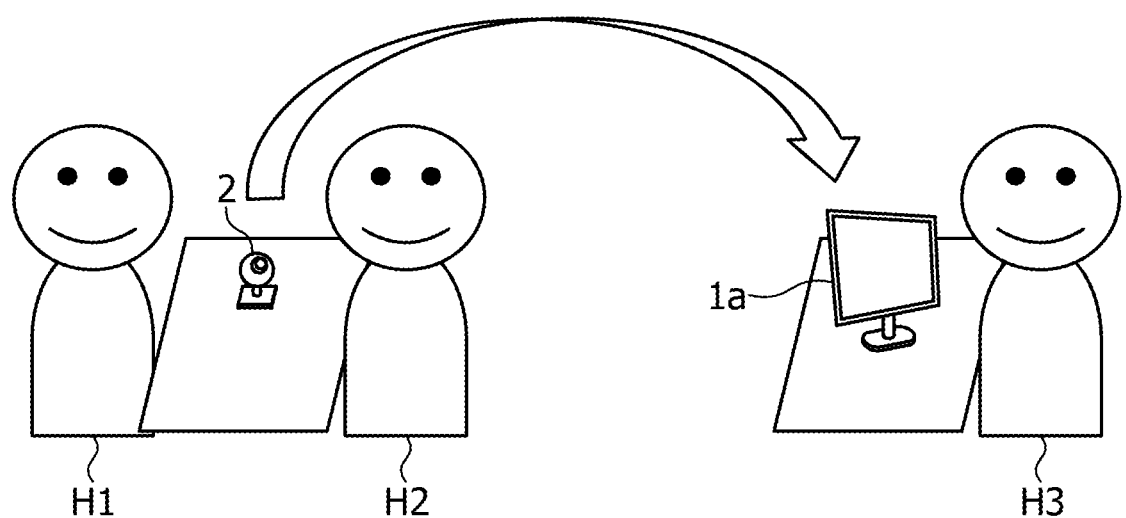
FIG. 4 is an explanatory diagram explaining an example of a system configuration according to the first embodiment.

FIG. 4 is an explanatory diagram explaining an example of a system configuration according to the first embodiment. As illustrated in FIG. 4, a camera 2 captures a moving image of a store employee H2 at a customer reception scene of a customer H1 and the store employee H2 and outputs the captured moving image to a terminal device 1a of a boss H3.

The terminal device 1a is an information processing apparatus, such as a PC to which the above-described detection device 1 is applied, or the like and detects a background image from the moving image captured by the camera 2. The terminal device 1a detects motion of the store employee H2 at the time of customer reception by the background difference method based on the detected background image, evaluates customer reception by the store employee H2 toward the customer H1, and displays the evaluation result to a display, or the like. Thereby, it is possible for the boss H3 to check customer reception by the store employee H2.

Figure 5:
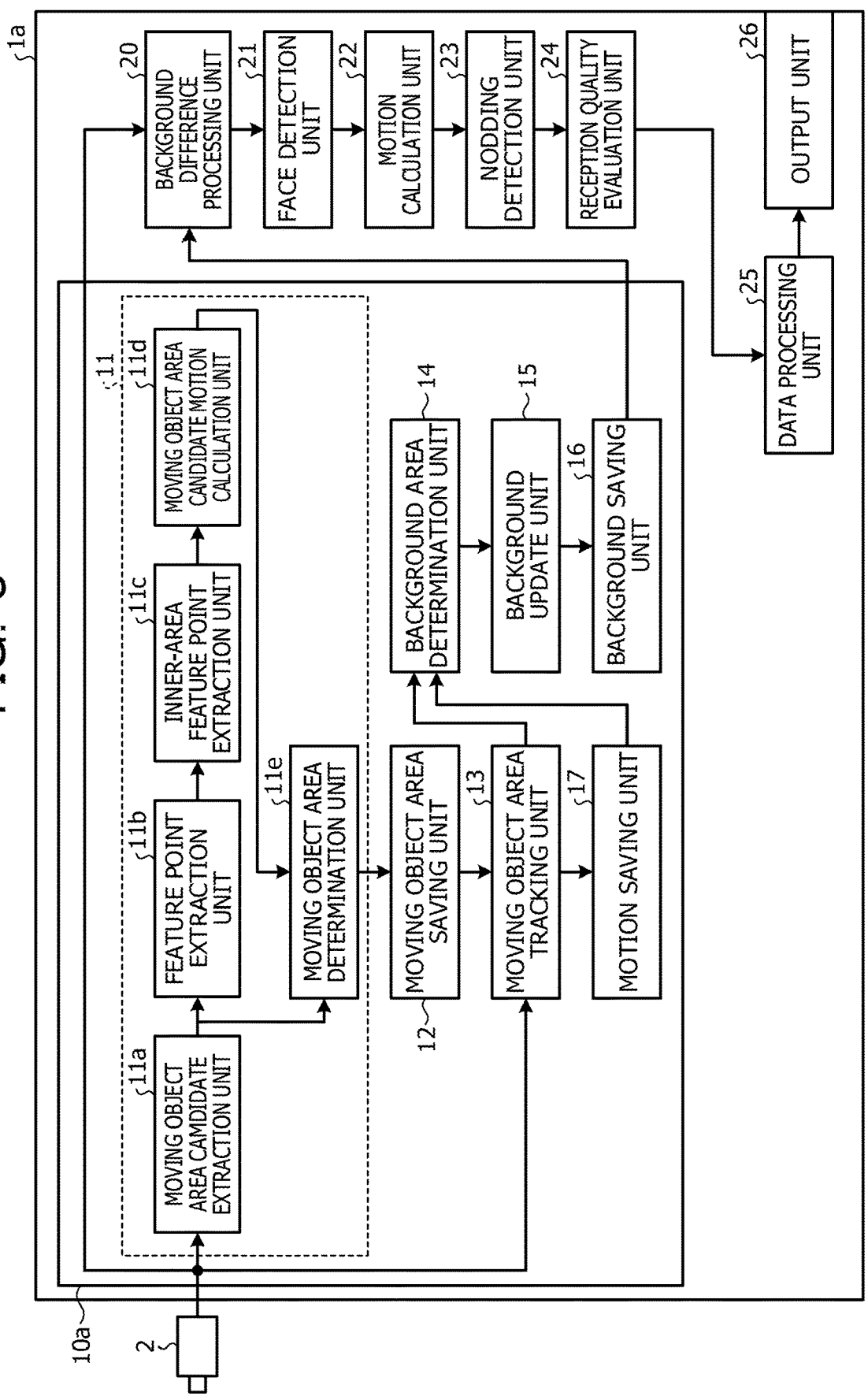
FIG. 5 is a block diagram illustrating an example of the functional configuration of a system according to the first embodiment.

FIG. 5 is a block diagram illustrating an example of the functional configuration of a system according to the first embodiment. As illustrated in FIG. 5, a terminal device is includes a background detection unit 10a, a background difference processing unit 20, a face detection unit 21, motion calculation unit 22, a nodding detection unit 23, a reception quality evaluation unit 24, a data processing unit 25, and an output unit 26.

The background detection unit 10a includes a moving object area extraction unit 11, a moving object area saving unit 12, a moving object area tracking unit 13, a background area determination unit 14, a background update unit 15, a background saving unit 16, and a motion saving unit 17.

The moving object area extraction unit 11 includes a moving object area candidate extraction unit 11a, a feature point extraction unit 11b, an inner-area feature point extraction unit 11c, a moving object area candidate motion calculation unit 11d, and a moving object area determination unit 11e.

The moving object area candidate extraction unit 11a extracts a candidate of a moving object area based on the correlation of the preceding and the following frames. Specifically, for example, as illustrated by the following expression (1), the moving object area candidate extraction unit 11a obtains an area R1 having a correlation lower than that of the correlation information G2 between the frame to be processed and the preceding frame as a moving object area candidate in the frame to be processed.

[Expression 1]

$$\Sigma_{m=-M,\ldots,M,n=-N,\ldots,N}|G(t,x+m,y+n)-G(t+1,x+m,y+n)|>T1 \quad (1)$$

In the expression (1), t is time related to a frame, and G (t, x, y) is a pixel (x, y) in a frame at time (t). A threshold value T1 is a threshold value set in advance for determining a correlation value. The moving object area candidate extraction unit 11a obtains a set C of pixel points (x, y) that satisfies the expression (1), that is to say, a moving object area candidate.

The feature point extraction unit 11b extracts a feature point in the image from the moving object area candidate at the current time (t) extracted by the moving object area candidate extraction unit 11a. For example, the feature point extraction unit 11b extracts a point $(x, y) \in C$ that satisfies two or more expressions out of the four expressions in the following expression (2) as a feature point. The threshold value T2 is a threshold value set in advance for determining a feature point.

Thereby, the feature point extraction unit 11b extracts a point where two or more outstanding edges having different directions exist in the vicinity as a feature point. A set of points $(x, y) \in C$ that is extracted as points that satisfy two or more expressions out of the four expressions in the expression (2) is assumed to be P.

[Expression 2]

$$\left. \begin{array}{l} |G(t, x-1, y) - G(t, x+1, y)| > T2 \\ |G(t, x, y-1) - G(t, x, y+1)| > T2 \\ |G(t, x-1, y-1) - G(t, x+1, y+1)| > T2 \\ |G(t, x-1, y+1) - G(t, x+1, y-1)| > T2 \end{array} \right\} \quad (2)$$

The inner-area feature point extraction unit 11c extracts a feature point in the moving object area candidate at the next time (t+1) based on the feature point extracted by the feature point extraction unit 11b as an inner-area feature point. Specifically, the inner-area feature point extraction unit 11c searches for a point having a correlation in brightness of a certain value or higher in the vicinity for each feature point among the points in the moving object area candidate in the frame at the next time (t+1) and determines the searched point as an inner-area feature point.

For example, assuming a point (k, l)∈C, the inner-area feature point extraction unit 11c obtains a point (x, y)∈P that satisfies the following expression (3) as an inner-area feature point. It is assumed that a threshold value T3 is a threshold value set in advance for determining the height of the correlation. A set of the obtained points is assumed to be P'. The set of inner-area feature points at the next time (t+1) is assumed to be C'.

[Expression 3]

$$\Sigma_{m=-M,\ldots,M,n=-N,\ldots,N}|G(t,x+m,y+n)-G(t+1,k+m,l+n)|>T3 \quad (3)$$

The moving object area candidate motion calculation unit 11d obtains motion by subtracting a position before the movement from a destination position for each inner-area feature point, calculates the average of the obtained motion as motion of the moving object area candidate. Specifically, the moving object area candidate motion calculation unit 11d calculates motion (u(t), v(t)) of the moving object area candidate by the following expression (4).

[Expression 4]

$$\left. \begin{array}{l} u(t) = \dfrac{\sum\limits_{(x,y)\in P',(k,l)\in C}(k-x)}{\text{(THE NUMBER OF POINTS INCLUDED IN }P')} \\ v(t) = \dfrac{\sum\limits_{(x,y)\in P',(k,l)\in C}(l-y)}{\text{(THE NUMBER OF POINTS INCLUDED IN }P')} \end{array} \right\} \quad (4)$$

The moving object area determination unit 11e determines a moving object area from the moving object area candidates. Specifically, when each point of the moving object area candidate at the current time is moved by the motion of the moving object area candidate calculated by the moving object area candidate motion calculation unit 11d, if the position after the movement is within the moving object area candidate, the moving object area determination unit 11e determines that the point is included in the moving object area.

For example, if (x+u, y+v)∈C' at each point (x, y)∈C, the point is determined to be included in the moving object area. Next, the moving object area determination unit 11e determines each point (a set R) of the moving object area candidate determined to be included in the moving object area as a moving object area. Thereby, the moving object area extraction unit 11 extracts a moving object area which is an image area corresponding to a moving object that appears in each frame.

The moving object area saving unit 12 extracts and saves pixels (set R) in the moving object area based on the moving object area determined by the moving object area determination unit 11e. That is to say, the moving object area saving unit 12 extracts and saves a moving object area extracted from each frame.

The moving object area tracking unit 13 refers to the moving object area saved in the moving object area saving unit 12 and tracks the position of a moving object area among frames based on the correlation of the moving image with each frame. Specifically, the moving object area tracking unit 13 obtains a translation quantity (p, q) that minimizes the value of the following expression (5) using a moving object area MR saved in the moving object area saving unit 12. The moving object area tracking unit 13 tracks a set of points that is produced by translating each point in the moving object area MR as a moving object area MR' at the next time.

[Expression 5]

$$\Sigma_{(x,y)\in MR}|G(t,x,y)-G(t+1,x+p,y+q)| \quad (5)$$

The moving object area tracking unit 13 saves the difference between the position of the moving object area at the current time and the position of the moving object area at the next time, that is to say, a translation quantity (p, q) in the motion saving unit 17 as motion.

The background area determination unit 14 determines an image area excluding the moving object area extracted by the moving object area extraction unit 11 as a background area of each frame. If a moving object area of which position has been tracked by the moving object area tracking unit 13 is included in a frame, the background area determination unit 14 also determines that an image area excluding the moving object area as a background area of each frame based on the tracking result by the moving object area tracking unit 13.

More specifically, the background area determination unit 14 determines the number of times the motion (u(k), v(k)) of the moving object area, of which position is tracked by the moving object area tracking unit 13, satisfies the following expression (6) at each time of k=1, . . . , t. A threshold value T4 is a threshold value set in advance for determining movement of a position.

[Expression 6]

$$|u(k)|+|v(k)|>T4 \quad (6)$$

Next, if the number of times the expression (6) is satisfied is equal to or higher than a threshold value T5, the background area determination unit 14 determines the image area excluding the moving object area of which position has been tracked by the moving object area tracking unit 13 as a background area. A threshold value T5 is a threshold value set in advance for determining the number of frames in which the position has moved.

That is to say, the background area determination unit 14 determines an image area excluding the moving object area of which position has moved over the number of frames equal to or larger than the threshold value T5 as a background area. In this manner, in the moving object area of which position has been tracked, an image area excluding a moving object area of which position has moved for the number of frames equal to or larger than the threshold value T5 is determined as a background area. Accordingly, for example, it is possible to suppress the situation in which branches of trees that are swayed by the wind for a few frames are regarded as a moving object area and excluded from the background.

The background update unit 15 multiplies a brightness value of each point in the background area in the frame at the current time by a predetermined value (fixed value α) based on the background area determined by the background area determination unit 14. Thereby, the background update unit 15 obtains a brightness value in the background area in the frame at the current time (a background image in the frame at the current time for adding to the background image (background model) up to the frame at the current time).

Next, the background update unit 15 reads the background image before the current time from the background saving unit 16 and adds the brightness value of the background area in the frame at the current time. The background update unit 15 determines a value produced by dividing the added background image by a sum value of 1 and a fixed value α as the background image up to the current time and updates the background image in the background saving unit 16. Specifically, the background update unit 15 updates the background for each point (x, y) that has been determined as a background in the background image (H) by the following expression (7).

[Expression 7]

$$H(t+1,x,y)=(G(t+1,x,y)\times\alpha+H(t,x,y))/(\alpha+1) \quad (7)$$

The background difference processing unit 20 performs background difference processing related to the background difference method. Specifically, the background difference processing unit 20 refers to a background image in the background saving unit 16 and detects a moving object image corresponding to a moving object included in each frame of the moving image G1 based on the difference between each frame of the moving image G1 of the camera 2 and the background image. That is to say, the background difference processing unit 20 is an example of the difference processing unit.

More specifically, the background difference processing unit 20 obtains a set of points that satisfies the following expression (8) based on the difference of a point G(t, x, y) of each frame of the moving image G1 with the background image H(t, x, y) in the background saving unit 16 as a moving object area HMR. A threshold value T6 is a threshold value set in advance for determining a moving object area HMR by the background difference method.

[Expression 8]

$$\Sigma_{m=-M,\ldots,M,n=-N,\ldots,N}|G(t,x+m,y+n)-H(t,x+m,y+n)|>T6 \quad (8)$$

The face detection unit 21 detects a face image of a person from the moving object area HMR detected by the background difference processing unit 20. Specifically, assuming that a face image of the store employee H2 captured in advance is F(x, y) (x=0, . . . , 2X, y=0, . . . , 2Y), the face detection unit 21 detects an area that satisfied the following expression (9) and included in the moving object area HMR as a face image.

[Expression 9]

$$\Sigma_{m=-X,\ldots,X,n=-Y,\ldots,Y}|F(X+m,Y+n)-G(t,k+m,l+n)|<T7 \quad (9)$$

In the expression (9), a threshold value T7 is a threshold value set in advance for determining a face. In the expression (9), an area (FR) to be a face image becomes a rectangle of (2X+1)×(2Y+1) with a pixel (k, l) as the center of the face.

The motion calculation unit 22 calculates motion of the face image detected by the face detection unit 21 in the preceding and the following frames. Specifically, the motion calculation unit 22 calculates (k, l) that minimizes the following expression (10) as the motion of the face.

[Expression 10]

$$\Sigma_{(x,y)\in FR}|G(t,x,y)-G(t+1,x+k,y+1)| \quad (10)$$

The nodding detection unit 23 detects nodding of the face based on the motion of the face calculated by the motion calculation unit 22, that is to say, nodding of the store employee H2. Specifically, when a value of v in the motion (u, v) of a face (motion of a face in the vertical direction at the time of nodding) has changed in a negative direction by the amount equal to or larger than a predetermined threshold value T8 and then has changed in a positive direction by the amount equal to or larger than the predetermined threshold value T8, the nodding detection unit 23 determines it as nodding.

For example, it is assumed that time before when v becomes the lowest value $v_{min}$ and at which a change less than the threshold value T5 occurs is a start time, and the value of v at that time is $y_{left}$. It is assumed that time after when v becomes the lowest value $v_{min}$ and at which a change less than the threshold value T5 occurs is an end time, and the value of v at that time is $v_{right}$. The nodding detection unit 23 obtains the length of time of nodding (i) and the depth (j) of nodding, which is the amount of change of v, by the following expression (11).

[Expression 11]

$$i=(\text{END TIME})-(\text{START TIME}), j=((v_{left}-v_{min})+(v_{right}-v_{min}))/2 \quad (11)$$

The reception quality evaluation unit 24 evaluates the reception quality of the store employee H2 toward the customer H1 based on the nodding of the store employee H2 detected by the nodding detection unit 23. That is to say, the reception quality evaluation unit 24 is an example of the evaluation unit that evaluates motion of the moving object based on the moving object image.

Specifically, the reception quality evaluation unit 24 obtains the reception quality of the store employee H2 from the length of time of nodding (i) and the depth of nodding (j) of the store employee H2 that are detected by the nodding detection unit 23 based on the related-art knowledge which states "when same nodding continues, a person to talk to feels that he or she is really heard".

For example, assuming that the length of time of nodding at the s-th time is $i_s$, and the depth of nodding is $j_s$, the reception quality evaluation unit 24 decrements s by 1 from when r is s−1 until when r satisfies the following two expressions (12). The reception quality evaluation unit 24 calculates the number of times R=s−r when the expressions (12) become unsatisfied. Next, the reception quality evaluation unit 24 calculates the evaluation value of the reception quality by (evaluation value)=1/R using the calculated number of times R.

[Expression 12]

$$\left.\begin{array}{l}|i_s - i_r| < T9 \\ |j_s - j_r| < T9\end{array}\right\} \quad (12)$$

The data processing unit 25 generates display data of the evaluation result to be displayed on a display based on the evaluation result of the reception quality evaluation unit 24. For example, the data processing unit 25 generates display data of a graph with time as the horizontal axis and evaluation value as the vertical axis. The output unit 26 displays the display data generated by the data processing unit 25 on the screen of the display and outputs the evaluation result to the boss H3. Thereby, it is possible for the boss H3 to check the reception quality of the store employee H2, for example, a change of the reception quality with time in the case of the graph with time as the horizontal axis and evaluation value as the vertical axis.

Figure 6:
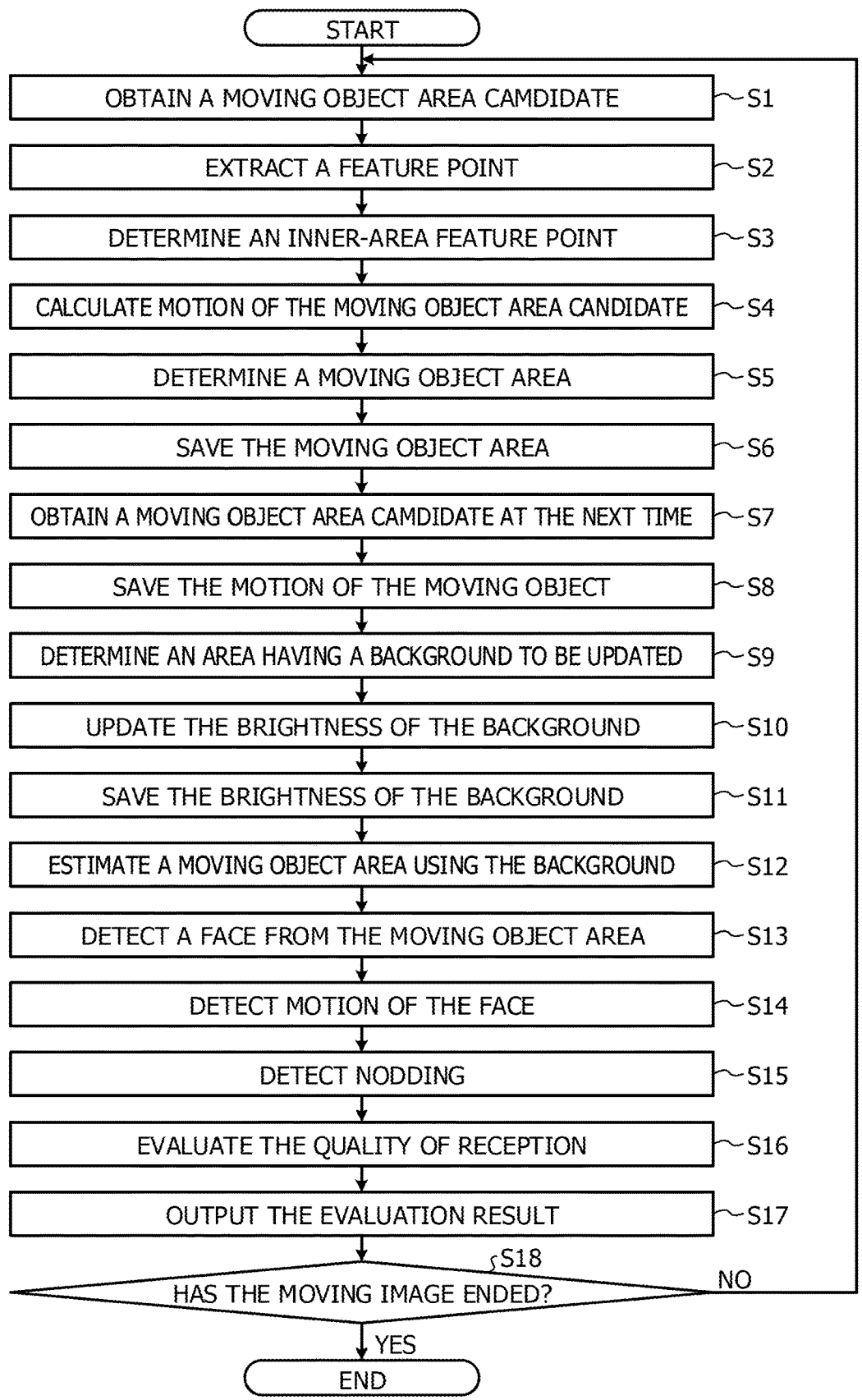
FIG. 6 is a flowchart illustrating an example of operation of the system according to the first embodiment.

FIG. 6 is a flowchart illustrating an example of operation of the system according to the first embodiment. As illustrated in FIG. 6, when the processing is started, the moving object area candidate extraction unit 11a obtains a moving object area candidate based on the correlation between the frame at the current time (t) and the preceding or the following frames based on a moving image G1 from the camera 2 (S1). Next, the feature point extraction unit 11b extracts a feature point in the image from the moving object area candidates at the current time (t) (S2).

Next, the inner-area feature point extraction unit 11c searches for a point having a brightness correlation of a certain value or higher with the vicinity for each feature point among the points in the moving object area candidates in the frame at the next time (t+1) and determines the searched point as an inner-area feature point (S3).

Next, the moving object area candidate motion calculation unit 11d obtains motion produced by subtracting the position before movement from the destination position for each inner-area feature point and calculates motion of the moving object area candidate (S4).

Next, the moving object area determination unit 11e determines a moving object area from the moving object area candidates (S5), and the moving object area saving unit 12 saves the moving object area determined by the moving object area determination unit 11e (S6).

Next, the moving object area tracking unit 13 obtains a moving object area candidate at the next time and refers to the moving object area saved in the moving object area saving unit 12 and obtains a correlation so as to track the position of the moving object area among frames (S7).

Next, the moving object area tracking unit 13 saves motion (translation quantity (p, q)) of the moving object in the motion saving unit 17 based on the difference between the position of the moving object area at the current time and the position of the moving object area at the next time (S8).

Next, the background area determination unit 14 determines an area (background area) to be updated in the background image in the background saving unit 16 based on the moving object area extracted by the moving object area extraction unit 11 and the tracking result by the moving object area tracking unit 13 (S9).

Next, the background update unit 15 multiplies a brightness value of each point in the background area in the frame at the current time by a fixed value α based on the background area determined by the background area determination unit 14, adds the product thereof to the background image read from the background saving unit 16, and updates the brightness of the background image (S10). Next, the background update unit 15 saves the updated brightness of the background image in the background saving unit 16 as a background image in the frame in the frame up to the current time (S11).

Next, the background difference processing unit 20 estimates a moving object area from the moving image G1 of the camera 2 by the background difference method using the background (background image) saved in the background saving unit 16 (S12). Next, the face detection unit 21 detects a face from the moving object area estimated in S12 (S13). Next, the motion calculation unit 22 detects motion in the preceding and following frames of the face detected by the face detection unit 21 (S14).

Next, the nodding detection unit 23 detects nodding of the face, that is to say, nodding of the store employee H2 based on the motion of the face detected by the motion calculation unit 22 (S15). Next, the reception quality evaluation unit 24 evaluates the reception quality of the store employee H2 toward the customer H1 based on the nodding of the store employee H2 detected by the nodding detection unit 23 (S16). Next, the data processing unit 25 generates display data of the evaluation result by the reception quality evaluation unit 24 to be displayed on a display. The output unit 26 displays the display data generated by the data processing unit 25 on the screen and outputs the evaluation result of the reception quality of the store employee H2 to the boss H3 (S17).

Next, the background detection unit 10a determines whether or not the moving image has ended based on the existence of a moving image (the moving image G1) from the camera 2 (S18). If the moving image has ended (S18: YES), the processing of the background detection unit 10a is terminated. If the moving image has not ended (S18: NO), the processing of the background detection unit 10a returns to S1.

Second Embodiment

Figure 7:
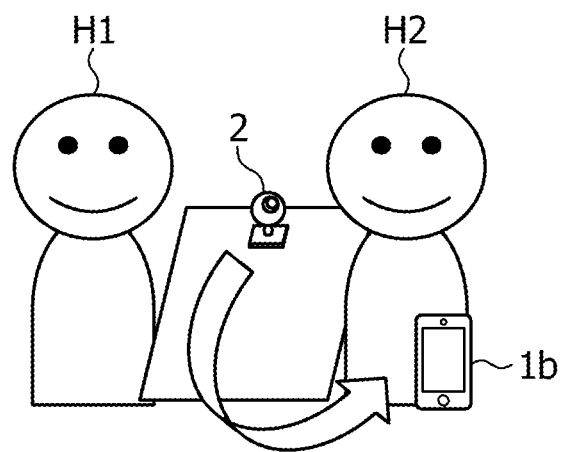
FIG. 7 is an explanatory diagram explaining an example of a system configuration according to a second embodiment.

FIG. 7 is an explanatory diagram explaining an example of a system configuration according to a second embodiment. As illustrates in FIG. 7, a camera 2 captures the image of a store employee H2 at the reception site of a customer H1 and the store employee H2 and outputs the captured moving image to a terminal device 1b of the store employee H2.

The terminal device 1b is an information processing apparatus, such as a smartphone to which the above-described detection device 1 is applied, or the like and detects a background image from a moving image captured by the camera 2. The terminal device 1b detects motion of the store employee H2 at the time of customer reception by the background difference method based on the background image, evaluates the customer reception by the store employee H2 toward the customer H1 and notify the store employee H2 of an evaluation result by vibration, or the like. Thereby, it is possible for the store employee H2 to check the customer reception by himself or herself.

Figure 8:
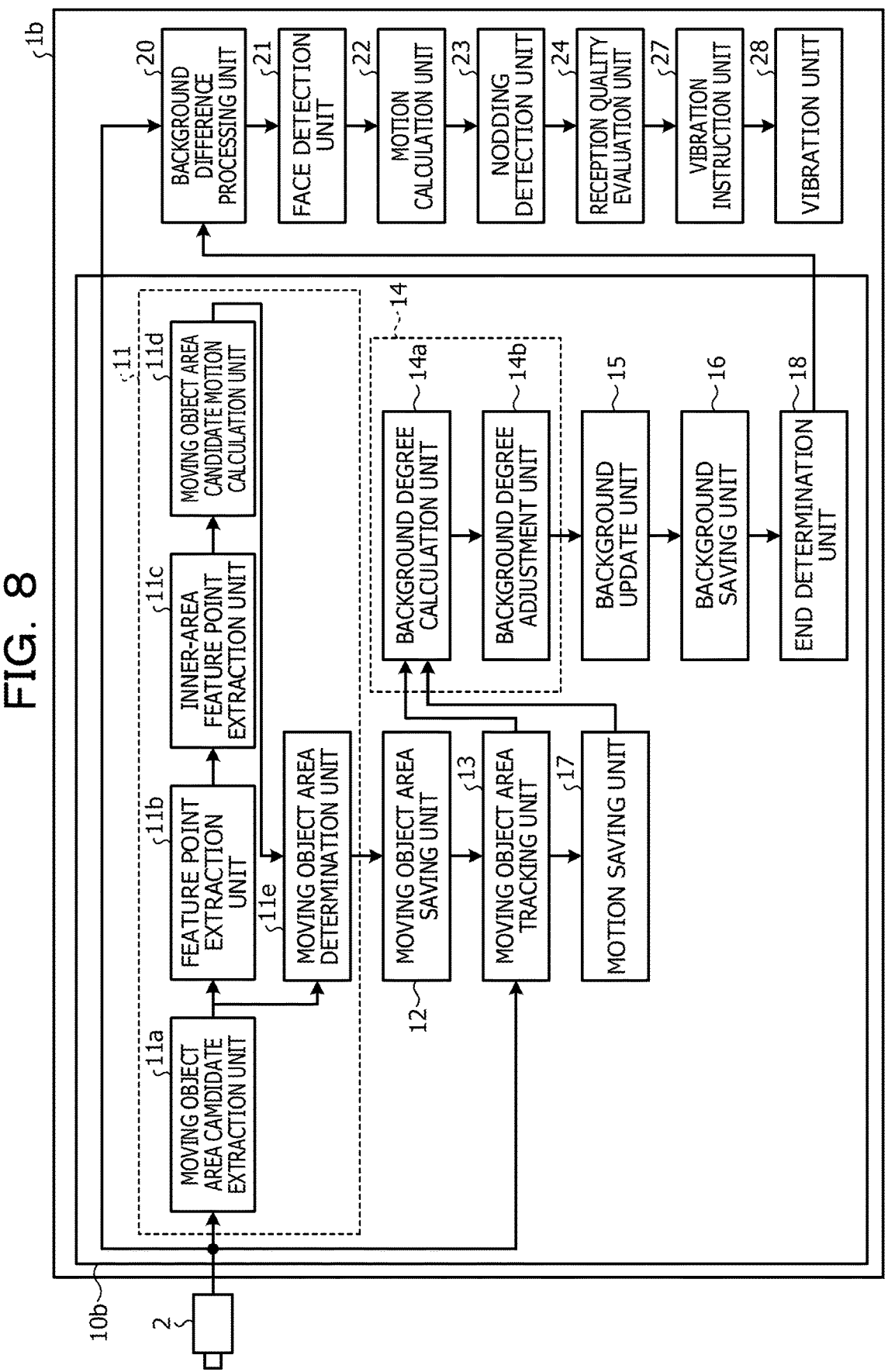
FIG. 8 is a block diagram illustrating an example of the functional configuration of a system according to the second embodiment.

FIG. 8 is a block diagram illustrating an example of the functional configuration of a system according to the second embodiment. As illustrated in FIG. 8, the terminal device 1b differs from the terminal device 1a according to the first embodiment in the point that the terminal device 1b includes a background detection unit 10b, a vibration instruction unit 27, and a vibration unit 28.

The background area determination unit 14 in the background detection unit 10b includes a background degree calculation unit 14a and a background degree adjustment unit 14b. The background degree calculation unit 14a calculates the background degree of the moving object area based on the number of frames in which the position of the tracked moving object area has moved based on the tracking result by the moving object area tracking unit 13. That is to say, the background degree calculation unit 14a is an example of the calculation unit.

Specifically, the background degree calculation unit 14a calculates a background degree, which has a lower value as the number of frames with motion increases, based on the number of frames having moved position up to the current time, which has been obtained from the tracking result of the moving object area tracking unit 13.

More specifically, assuming that the number of frames (the number of times) having motion from the frames of the past up to the current time is A, the background degree calculation unit 14a calculates a background degree (HD), which defines, for example, the maximum value of 1, based on the following expression (13).

[Expression 13]

$$HD=1/(A+1) \tag{13}$$

The background degree adjustment unit 14b adjusts the size of the background degree (HD) calculated by the background degree calculation unit 14a based on a predetermined threshold value. For example, the background degree adjustment unit 14b regards a weight value less than a predetermined lower-limit threshold value as 0 out of the background degrees (HD) and regards the size of the background degree (HD) less than the lower-limit threshold value as 0. The background degree adjustment unit 14b regards a value equal to or higher than a predetermined upper-limit threshold value T10 out of the background degrees (HD) as the same value as the threshold value T10. Thereby, for a value equal to or higher than the upper-limit threshold value T10, the size of the background degree (HD) is fixed at the threshold value T10.

The background update unit 15 changes a fixed value α at the time of updating the background to a value in accordance with the background degree (HD) adjusted by the background degree adjustment unit 14b. Specifically, based on the background area determined by the background area determination unit 14, the background update unit 15 multiplies a brightness value of each point in the background area in the frame at the current time by the value of the background degree (HD). Next, the background update unit 15 reads the background image before the current time from the background saving unit 16, and adds the brightness value of the background area in the frame at the current time. For the sum of the background images, the background update unit 15 determines a value obtained by dividing the sum by a value produced by adding 1 to the background degree (HD) to be a background image up to the current time and updates the background image in the background saving unit 16.

More specifically, the background update unit 15 updates the background for each point (x, y) determined as a background in the background image (H) with the following expression (14).

[Expression 14]

$$H(t+1,x,y)=(G(t+1,x,y) \times HD+H(t,x,y))/(HD+1) \quad (14)$$

In this manner, the background update unit 15 applies the background degree based on the number of frames in which the position of the moving object area is tracked by the moving object area tracking unit 13 to update the background in place of a fixed value α. Accordingly, for example, it is possible for the background update unit 15 to suitably exclude a moving object that has moved for a long time from the background. It is possible for the background update unit 15 to update so as to include a moving object having motion in the past in a short period and estimated to be a background in the background.

The background detection unit 10b includes an end determination unit 18. The end determination unit 18 refers to a background image saved in the background saving unit 16 and determines whether or not to terminate detection of a background based on the correlation of the brightness of the background at the current time and at the next time. For example, if the same background image continues for a predetermined time period in the moving image G1 from the correlation of brightness of the background at the current time and at the next time, the end determination unit 18 determines that the background does not have to be detected and terminates detection of a background.

More specifically, if the case where the correlation of the brightness between the background image H(t, x, y) at the current time and the background image H(t+1, x, y) at the next time satisfies the following expression (15) continues for a predetermined threshold value T12 or longer, the end determination unit 18 determines to terminate detection of a background. The threshold value T11 is a threshold value set in advance for evaluating whether or not the same background image continues.

[Expression 15]

$$\Sigma_{(x,y) \in H}|H(t,x,y)-H(t+1,x,y)|<T11 \quad (15)$$

The background detection unit 10b terminates detection of a background based on the determination result of the end determination unit 18. Thereby, it is possible for the background detection unit 10b to terminate detection of a background, for example, in the case where a period in which a background does not change continues in the moving image G1.

The vibration instruction unit 27 determines whether or not to transmit a vibration instruction given to the store employee H2 to the vibration unit 28 based on evaluation result of the reception quality evaluation unit 24. For example, if a state in which the evaluation value by the reception quality evaluation unit 24 is less than a predetermined value continues for a predetermined period of time, the vibration instruction unit 27 transmits a vibration instruction given to the store employee H2 to the vibration unit 28. The vibration unit 28 vibrates based on the instruction of the vibration instruction unit 27 and notifies the store employee H2 by vibration. Thereby it is possible for the store employee H2 to recognize that, for example, a state in which the evaluation value of the reception quality is lower than a predetermined value continues as the evaluation result of the reception quality evaluation unit 24.

Figure 9A:
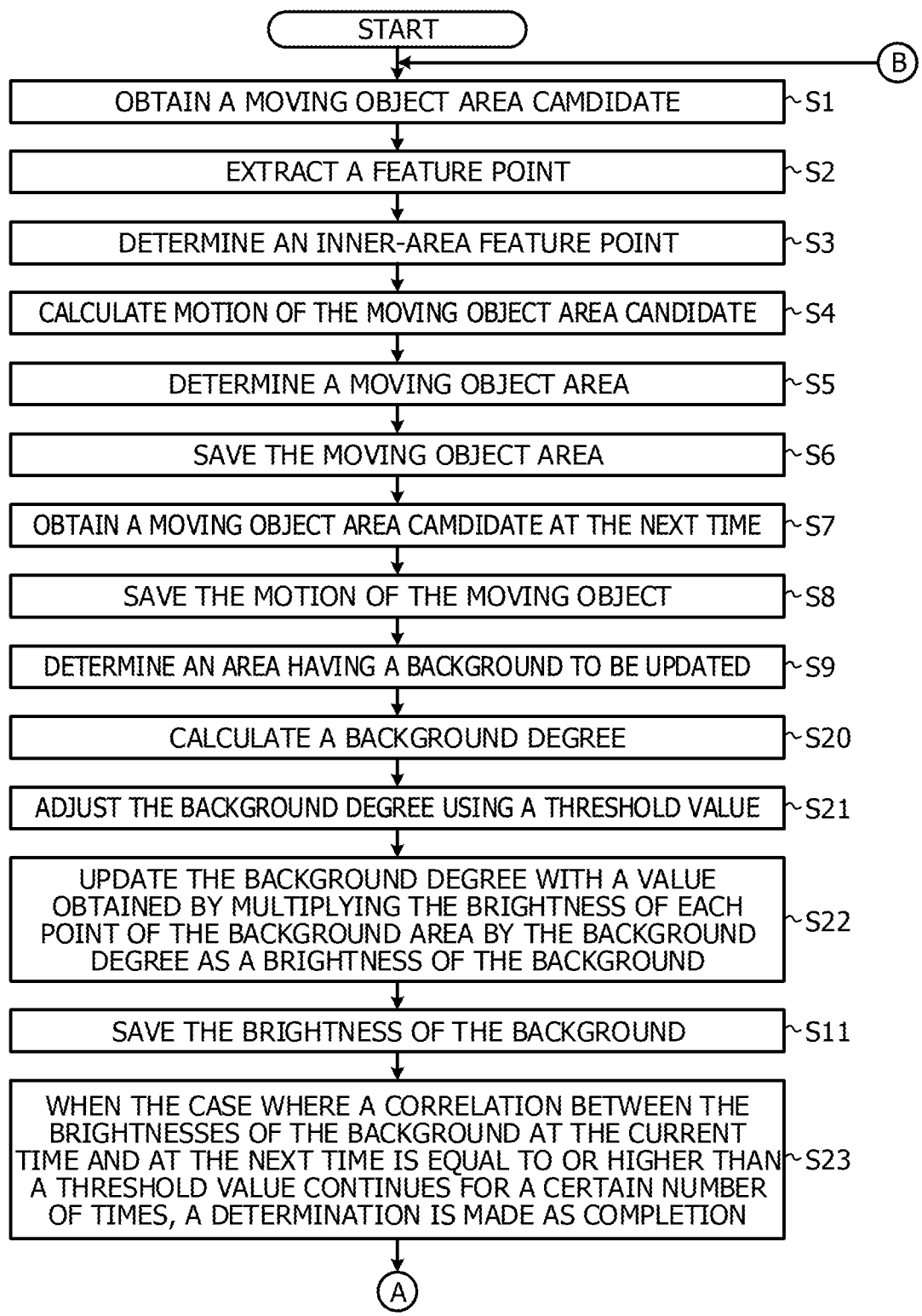
FIGS. 9A and 9B are flowcharts illustrating an example of the operation of the system according to the second embodiment.
Figure 9B:
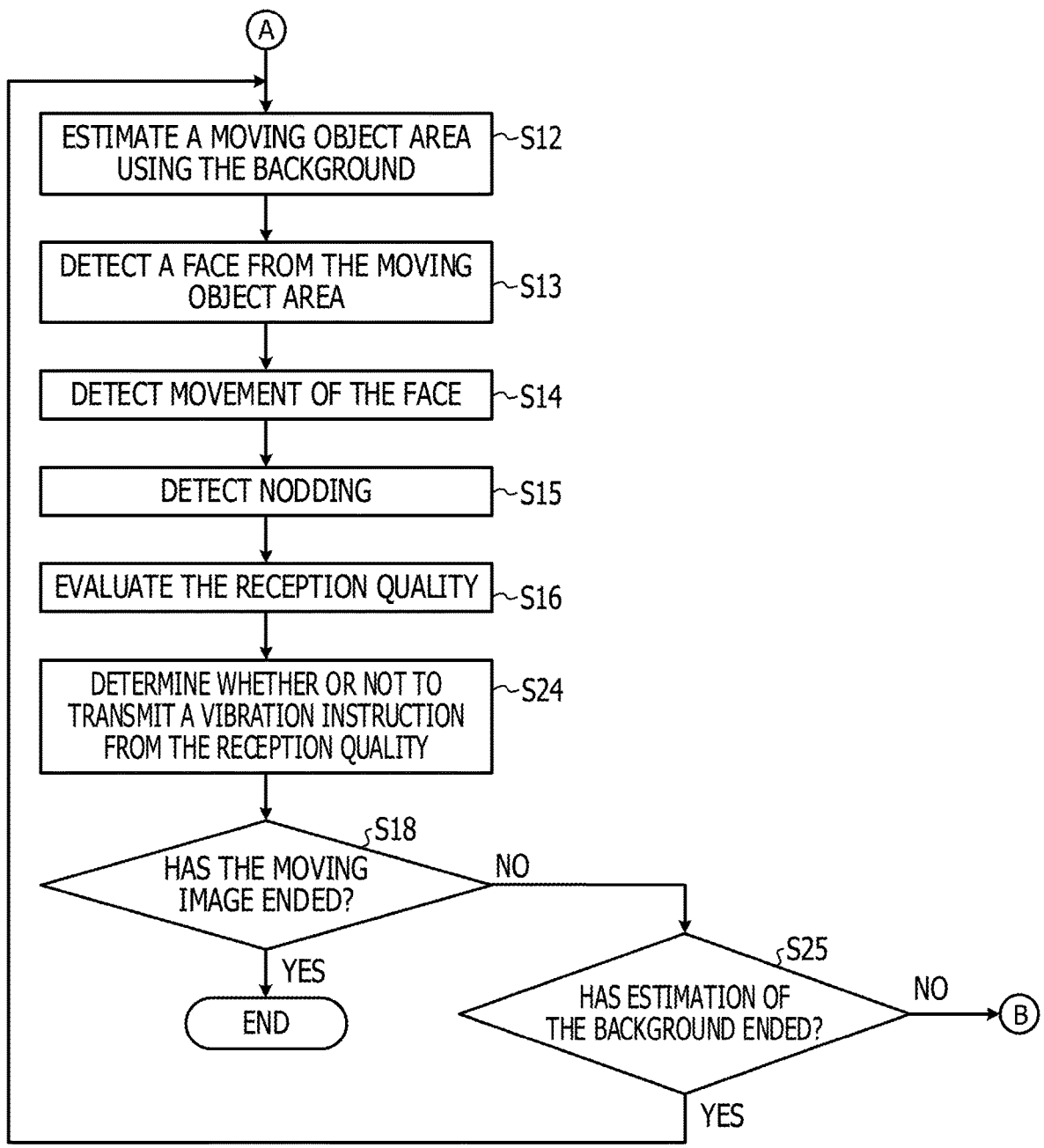

FIGS. 9A and 9B are flowcharts illustrating an example of the operation of the system according to the second embodiment. As illustrated in FIGS. 9A and 9B, the flowchart differs from the flowchart according to the first embodiment in the point of including the processing of S20 to S25.

Specifically, subsequent to S9, the background degree calculation unit 14a calculates the background degree (HD) of the moving object area based on the tracking result of the moving object area tracking unit 13 (S20). Next, the background degree adjustment unit 14b adjusts the size of the background degree (HD) calculated by the background degree calculation unit 14a using a predetermined threshold value (S21).

Next, the background update unit 15 determines a value produced by multiplying the brightness of each point in the background area by the value of the background degree (HD) as the brightness of the background and updates the background image in the background saving unit 16 (S22).

Subsequent to S11, the end determination unit 18 refers to the background image saved in the background saving unit 16 and determines whether or not the case where the correlation of brightness of the background images at the current time and at the next time is equal to or higher than a threshold value continues for a certain number of times (S23).

Subsequent to S16, the vibration instruction unit 27 determines whether or not to transmit a vibration instruction to the vibration unit 28 based on the evaluation result (reception quality) of the reception quality evaluation unit 24 (S24).

Figure 10:
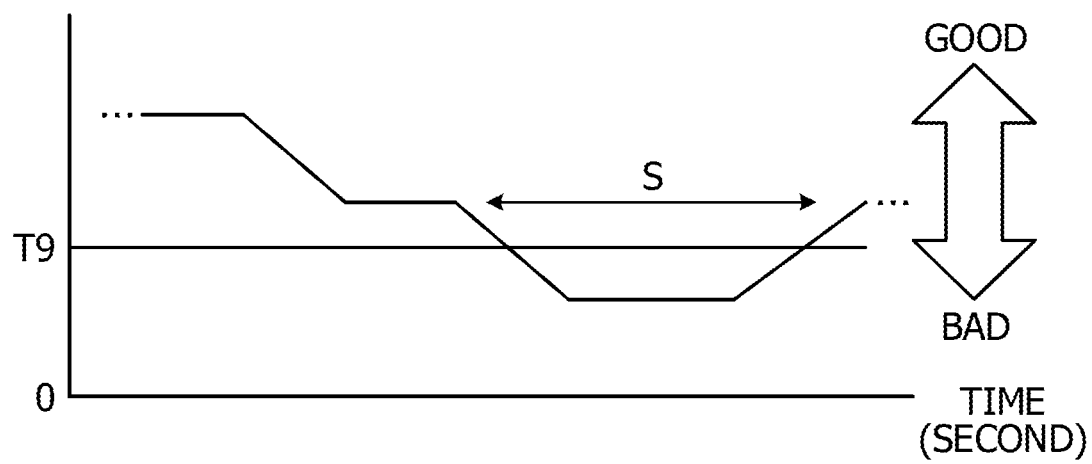
FIG. 10 is an explanatory diagram explaining determination of a vibration instruction.

FIG. 10 is an explanatory diagram explaining determination of a vibration instruction. In FIG. 10, the horizontal axis represents the time axis, and the vertical axis represents the evaluation value of the graph. As illustrated in FIG. 10, regarding a graph of the evaluation value in the evaluation result by the reception quality evaluation unit 24, when a period S in which the evaluation value is lower than a threshold value T9 continues for a predetermined period, the vibration instruction unit 27 transmits a vibration instruction to the vibration unit 28. By the vibration of the vibration unit 28 caused by the vibration instruction, it is possible for the store employee H2 to recognize, for example, that a state in which the evaluation value of the reception quality is lower than the threshold value T9 continues for a certain period of time.

Referring back to FIG. 9B, if S18 is negative determination (S18: NO), the background detection unit 10b determines whether or not to end background detection (background estimation) based on the determination result of the end determination unit 18 (S25). If background detection is to be ended (S25: YES), the processing of the background detection unit 10b returns to S12. If background detection is not to be ended (S25: NO), the processing of the background detection unit 10b returns to S1.

Third Embodiment

Figure 11:
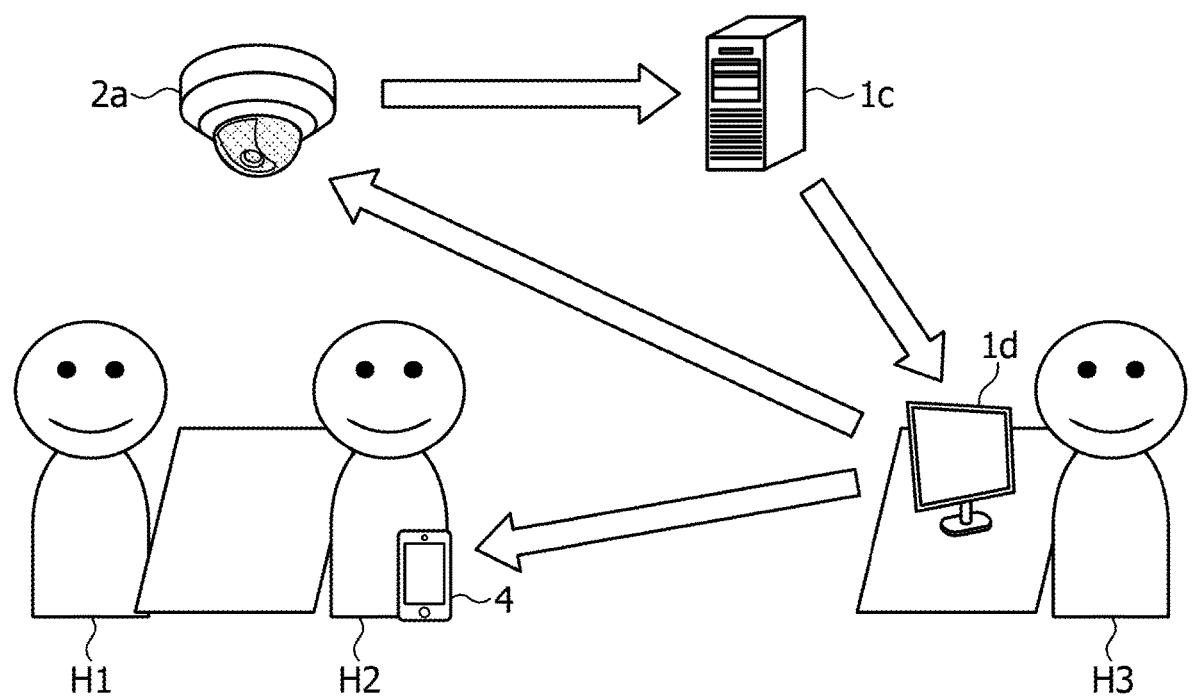
FIG. 11 is an explanatory diagram explaining an example of a system configuration according to a third embodiment.

FIG. 11 is an explanatory diagram explaining an example of a system configuration according to a third embodiment. As illustrated in FIG. 11, a camera 2a is a camera capable of operating the shooting direction, zoom in/zoom out, and the like by a boss H3 via a terminal device 1d. The camera 2a captures the image of a reception site of a customer H1 and a store employee H2 based on the operation by the boss H3 and outputs the captured moving image to a server device 1c.

The server device 1c is an information processing apparatus to which the detection device 1 is applied and which detects a background image from the moving image by the camera 2a. The server device is detects motion of the store employee H2 at the time of customer reception by the background difference method based on the detected background image, evaluates the customer reception by the store employee H2 toward the customer H1, and notifies the terminal device 1d. The terminal device 1d displays the notified evaluation of the customer reception to a display, or the like. The terminal device 1d receives input of an instruction (feedback) given by the boss H3 to the store employee H2 with respect to the evaluation of the customer reception and feeds back the input instruction to a terminal device 4 of the store employee H2.

Figure 12:
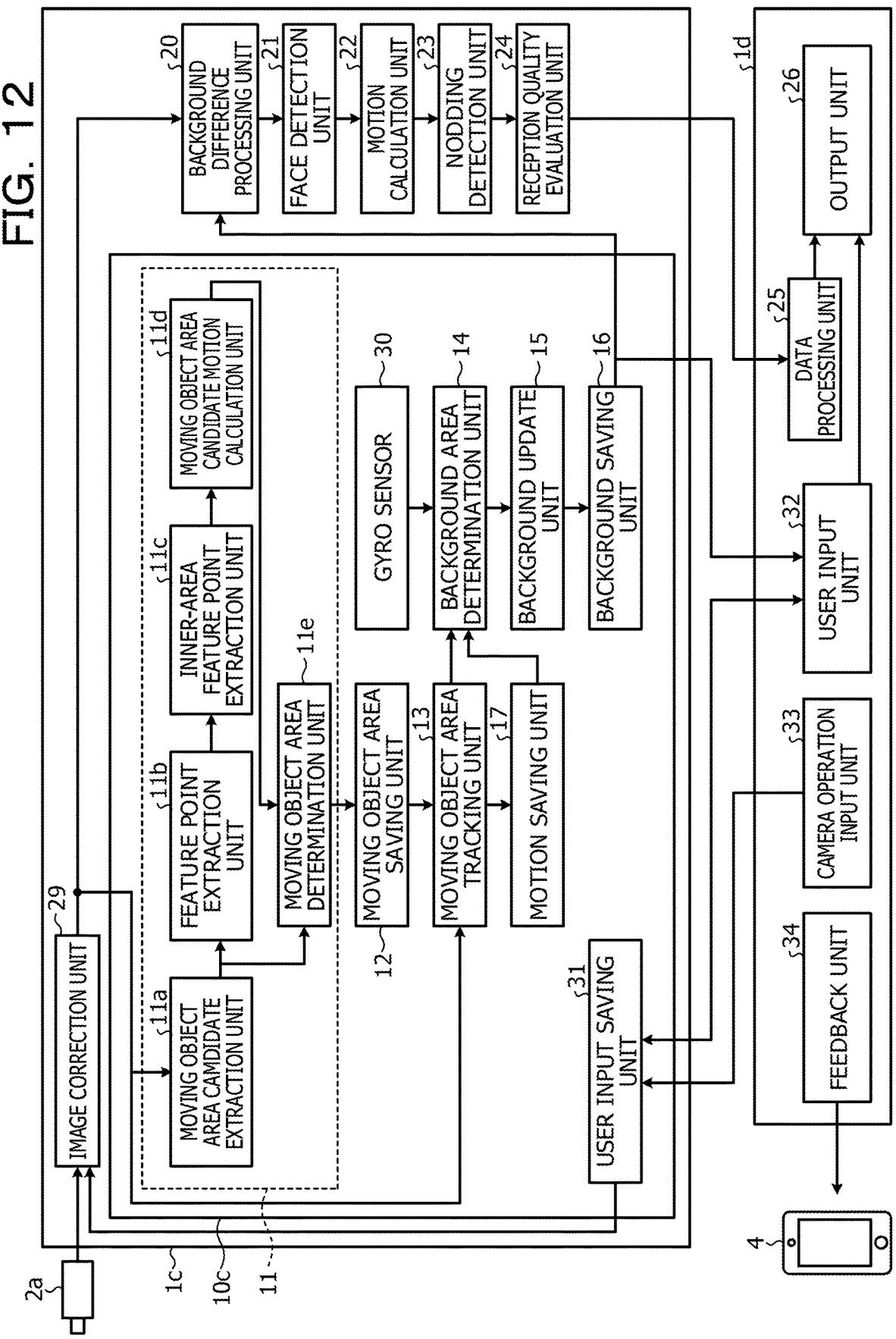
FIG. 12 is a block diagram illustrating an example of the functional configuration of a system according to the third embodiment.

FIG. 12 is a block diagram illustrating an example of the functional configuration of a system according to the third embodiment. As illustrated in FIG. 12, the server device is differs from the terminal device 1a according to the first embodiment in the point of including a background detection unit 10c and an image correction unit 29.

The background detection unit 10c includes a gyro sensor 30 and a user input saving unit 31. The gyro sensor 30 is a sensor that detects motion of the camera 2a in x-, y-, and z-axis directions and is an example of the motion detection unit. The user input saving unit 31 saves an input instruction given by the user (boss H3) at the terminal device 1d, for example, an operation instruction of the camera 2a, or the like.

The background area determination unit 14 corrects displacements involved with the motion of the camera 2a in the background area in each frame based on the motion of the camera 2a, detected by the gyro sensor 30. Specifically, the background area determination unit 14 corrects rotational displacements involved with the motion (rotations with the x-axis (horizontal), the y-axis (vertical), and the z-axis (optical axis) as center) of the camera based on a rotation matrix Rot illustrated by the next expression (16). In the expression (16), it is assumed that the rotation angles in the motion of the camera 2a, which have been detected by the gyro sensor 30, are θx, θy, and θz. Thereby, it is possible for the background area determination unit 14 to obtain a background image of which displacements involved with the motion of the camera 2a has been corrected.

[Expression 16]

$$\text{Rot}(\theta x, \theta y, \theta z) = \begin{pmatrix} \cos(\theta y)\cos(\theta z) & \sin(\theta x)\sin(\theta y)\cos(\theta z) - \cos(\theta x)\sin(\theta z) & \cos(\theta x)\sin(\theta y)\cos(\theta z) + \sin(\theta x)\sin(\theta z) \\ \cos(\theta x)\sin(\theta z) & \sin(\theta x)\sin(\theta y)\sin(\theta z) + \cos(\theta x)\cos(\theta z) & \cos(\theta x)\sin(\theta y)\sin(\theta z) + \sin(\theta x)\cos(\theta z) \\ -\sin(\theta y) & -\sin(\theta x)\cos(\theta y) & \cos(\theta x)\cos(\theta y) \end{pmatrix} \quad (16)$$

The image correction unit 29 corrects the image (the moving image G1) of the camera 2a based on the operation instruction of the camera 2a saved in the user input saving unit 31. Specifically, the image correction unit 29 corrects the moving image G1 so as to cancel the zoom in/zoom out performed by the user.

More specifically, the image correction unit 29 calculates the corrected moving image (G') by the next expression (17), where the zoom factor of the zoom in/zoom out performed by the user is Z. In the expression (17), it is assumed that U(x) is a function to suppress the decimal places of x.

[Expression 17]

$$G'(t+1,x,y) = (x/Z - U(x/Z)) \times (y/Z - U(y/Z)) \times G(t, U(x/Z), U(y/Z)) + (1 - x/Z + U(x/Z)) \times (y/Z - U(y/Z)) \times G(t, U(x/Z) + 1, U(y/Z)) + (x/Z - U(x/Z)) \times (1 - y/Z + U(y/Z)) \times G(t, U(x/Z), U(y/Z) + 1) + (1 - x/Z + U(x/Z)) \times (1 - y/Z + U(y/Z)) \times G(t, U(x/Z) + 1, U(y/Z) + 1) \quad (17)$$

The terminal device 1d includes a data processing unit 25, an output unit 26, a user input unit 32, a camera operation input unit 33, and a feedback unit 34. The user input unit 32 receives various kinds of user input, such as processing end, the contents of the feedback to the store employee H2, or the like based on the input from an input device (not illustrated in the figure), such as a keyboard, a mouse, or the like. The user input unit 32 notifies the user input saving unit 31 of the received operation contents.

The camera operation input unit 33 receives an operation input (shooting direction and zoom in/zoom out), and the like regarding the camera 2a based on the input from the input device (not illustrated in the figure), such as a keyboard, a mouse, or the like. The camera operation input unit 33 notifies the user input saving unit 31 of the received operation contents. The feedback unit 34 notifies the terminal device 4 of the contents of the feedback to the store employee H2, which has been received by the user input unit 32.

Figure 13A:
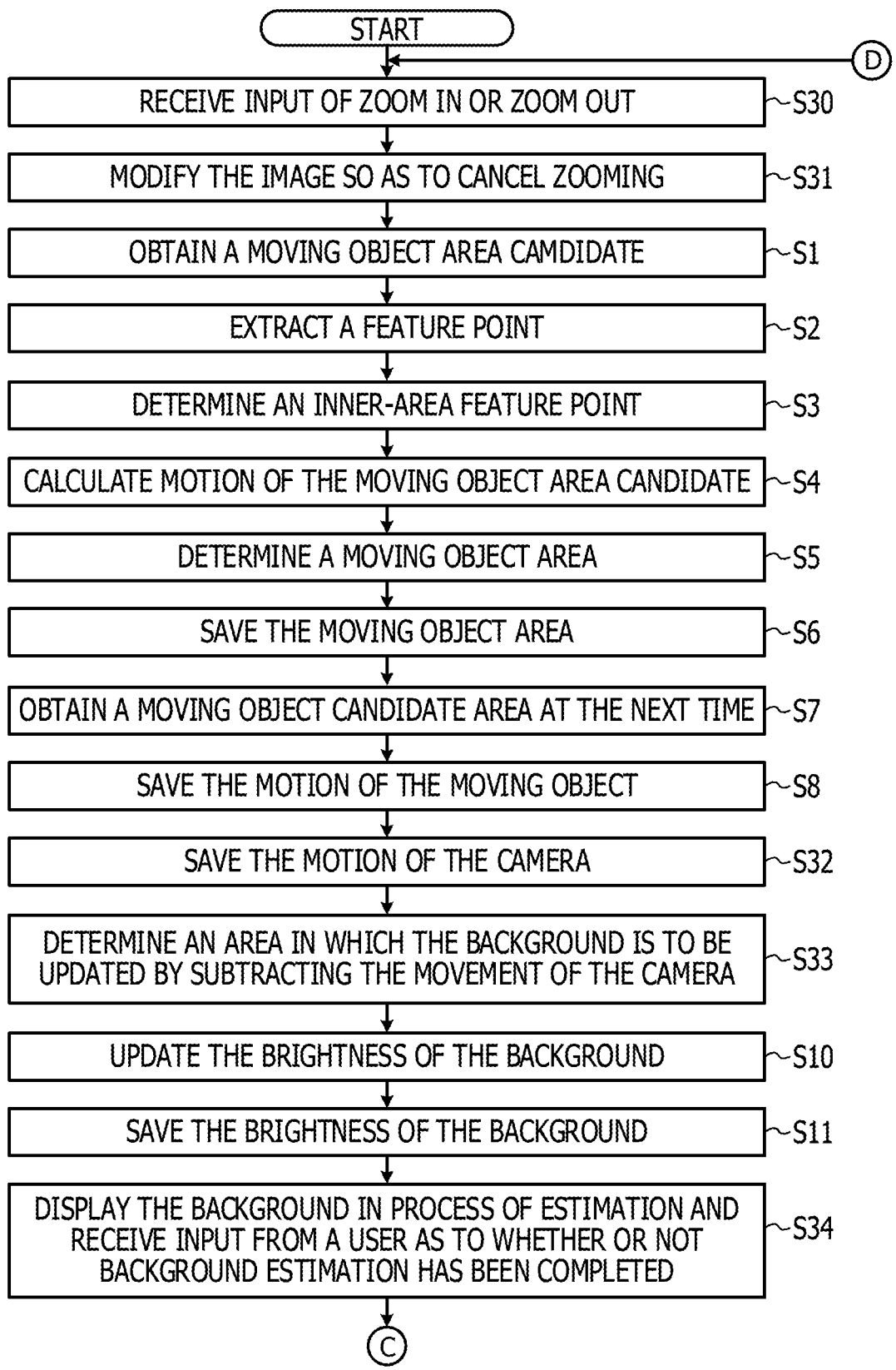
FIGS. 13A and 13B are flowcharts illustrating an example of operation of the system according to the third embodiment.
Figure 13B:
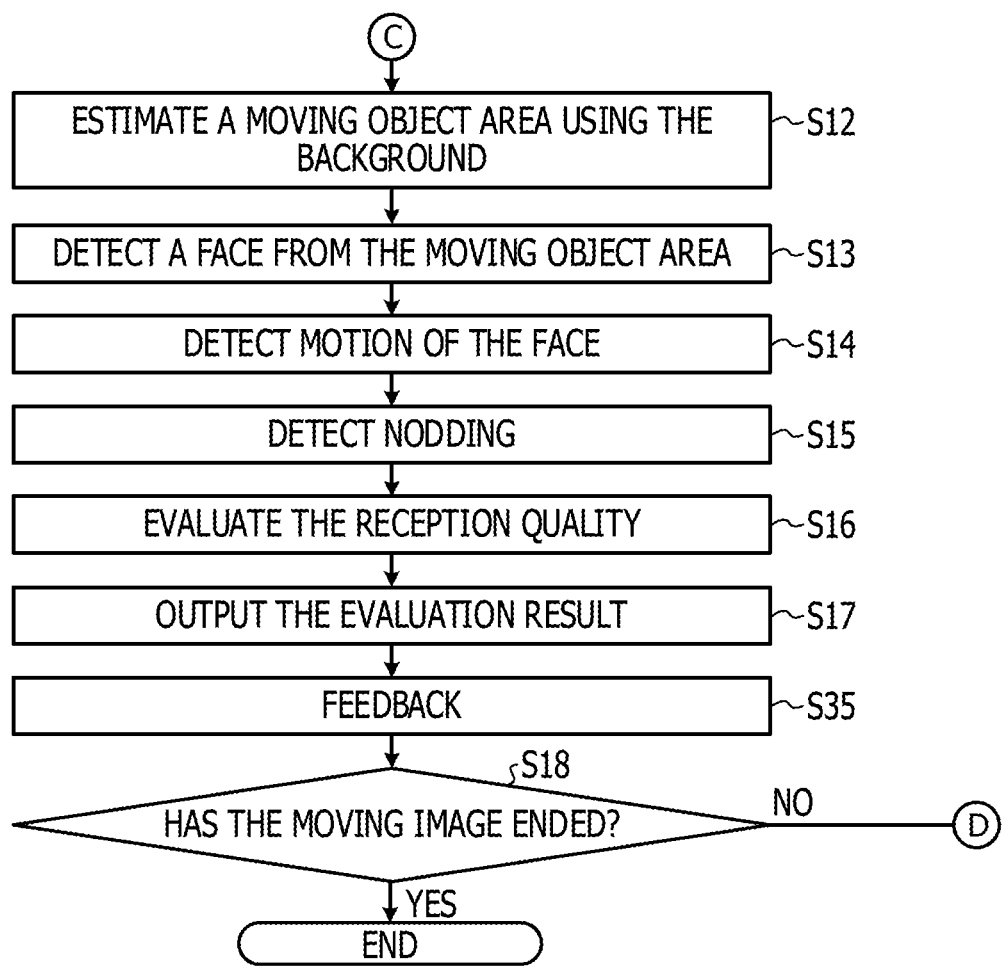

FIGS. 13A and 13B are flowcharts illustrating an example of operation of the system according to the third embodiment. As illustrated in FIGS. 13A and 13B, the operation according to the third embodiment differs from the operation according to the first embodiment in the point of including the processing of S30 to S35.

Specifically, the camera operation input unit 33 receives an input of zoom in/zoom out from the user (boss H3) (S30).

The input contents of zoom in/zoom out received by the camera operation input unit 33 are saved in the user input saving unit 31.

Next, the image correction unit 29 modifies the image (moving image G1) so as to cancel zooming based on the input contents of zoom in/zoom out saved in the user input saving unit 31 (S31).

Subsequent to S8, the background area determination unit 14 obtains motion of the camera 2*a* from the gyro sensor 30 (S32). Next, the background area determination unit 14 corrects the displacements of the camera 2*a*, which are involved with the motion of the background area in each frame based on the motion of the camera 2*a* detected by the gyro sensor 30. Thereby, the background area determination unit 14 determines an area (background area) in which the background is to be updated by subtracting the motion of the camera 2*a* (S33).

Subsequent to S11, the user input unit 32 displays the background which is being estimated, that is to say, the background detected by the background detection unit 10*c* on a display from the output unit 26. Next, the user input unit 32 receives input as to whether or not the background estimation has been completed from the user (boss H3) (S34). If there is an input of a completion of the background estimation, the user input unit 32 saves a background estimation completion in the user input saving unit 31. If a background estimation completion is saved in the user input saving unit 31, the background detection unit 10*c* terminates the detection of a background by the background detection unit 10*c*.

Subsequent to S17, the feedback unit 34 notifies the terminal device 4 of the contents of the feedback to the store employee H2, which was received by the user input unit 32 from the user (boss H3) (S35). Thereby, the store employee H2 is notified of an instruction (feedback) given from the boss H3 to the store employee H2 via the terminal device 4.

As described above, the detection device 1 and the terminal devices 1*a*, 1*b*, and 1*c* include the moving object area extraction unit 11, the moving object area tracking unit 13, the background area determination unit 14, and the background update unit 15. The moving object area extraction unit 11 extracts a moving object area of a moving object included in a frame based on the comparison result of the preceding and the following frames of the input moving image. The moving object area tracking unit 13 tracks the position of the moving object area among the frames based on the correlation between the moving object area extracted by the moving object area extraction unit 11 and each frame of the moving image. The background area determination unit 14 determines an image area excluding the extracted moving object area in each frame of the moving image as a background area of each frame. If the moving object area of which position has been tracked by the moving object area tracking unit 13 is included in a frame, the background area determination unit 14 determines an image area excluding the moving object area as a background area in each frame. The background update unit 15 detects a background image in each frame of the moving image based on the background area in each frame determined by the background area determination unit 14.

Accordingly, for example, if a moving object that appears in a moving image stands still for a fixed time period, it is possible for the detection device 1 and the terminal devices 1*a*, 1*b*, and 1*c* to suppress detection of a moving object in the background image.

The background area determination unit 14 determines an image area excluding a moving object area in which a position has moved over the number of frames equal to or larger than the threshold value T5 as a background area. In this manner, in the moving object area of which position has been tracked, an image area excluding a moving object area of which position has moved for the number of frames equal to or larger than the threshold value T5 is determined as a background area. Accordingly, for example, it is possible to suppress the situation in which branches of trees that are swayed by the wind for a few frames are regarded as a moving object area and excluded from the background.

The detection device 1 and the terminal devices 1*a*, 1*b*, and 1*c* include a background saving unit 16 that saves background images detected up to the preceding frame of a predetermined frame of the moving image. The background update unit 15 multiplies a pixel value in the background area determined in a predetermined frame by a predetermined value (fixed value $\alpha$) and adds the product thereof to the background image saved in the background saving unit 16 so as to detect a background image corresponding to a predetermined frame. Thereby, it is possible for the detection device 1 and the terminal devices 1*a*, 1*b*, and 1*c* to update the background image by adding the background image (the background image of a predetermined frame) produced by multiplying the background images up to the preceding frame of a predetermined frame, that is to say, by a predetermined value in the background area determined in a predetermined frame for a background model.

In place of the predetermined value (fixed value $\alpha$), the detection device 1 and the terminal devices 1*a*, 1*b*, and 1*c* may apply a background degree (HD) based on the number of frames in which the position of the moving object area tracked by the moving object area tracking unit 13 has moved to update the background. In this case, it is possible to suitably exclude, for example, a moving object having motion for a long time period from the background. Alternatively, it is possible to update the background so as to include a moving object having motion in a short time period in the past and which is able to be estimated as a background in the background.

Each component of each device illustrated in the figures does not have to be physically configured as illustrated in the figures. That is to say, a specific form of distribution and integration of each device is not limited to the illustrated configuration, and it is possible to functionally or physically distribute or integrate all of or a part of the configuration in any unit in accordance with various loads, use states, and the like.

All of or any part of the various processing functions performed by the detection device 1, the terminal devices 1*a*, 1*b*, and 1*d*, the server device 1*c*, and the like (hereinafter referred to as a detection device 1 as a representative) may be executed on a CPU (or a microcomputer, such as an MPU, an MCU (Micro Controller Unit), or the like). It goes without saying that all of or any part of the various processing functions may be performed by a program that is analyzed and executed on a CPU (or a microcomputer, such as an MPU, an MCU, or the like), or by hardware based on wired logic. The various processing functions performed by the detection device 1 may be performed in combination of a plurality of computers using cloud computing.

Figure 14:
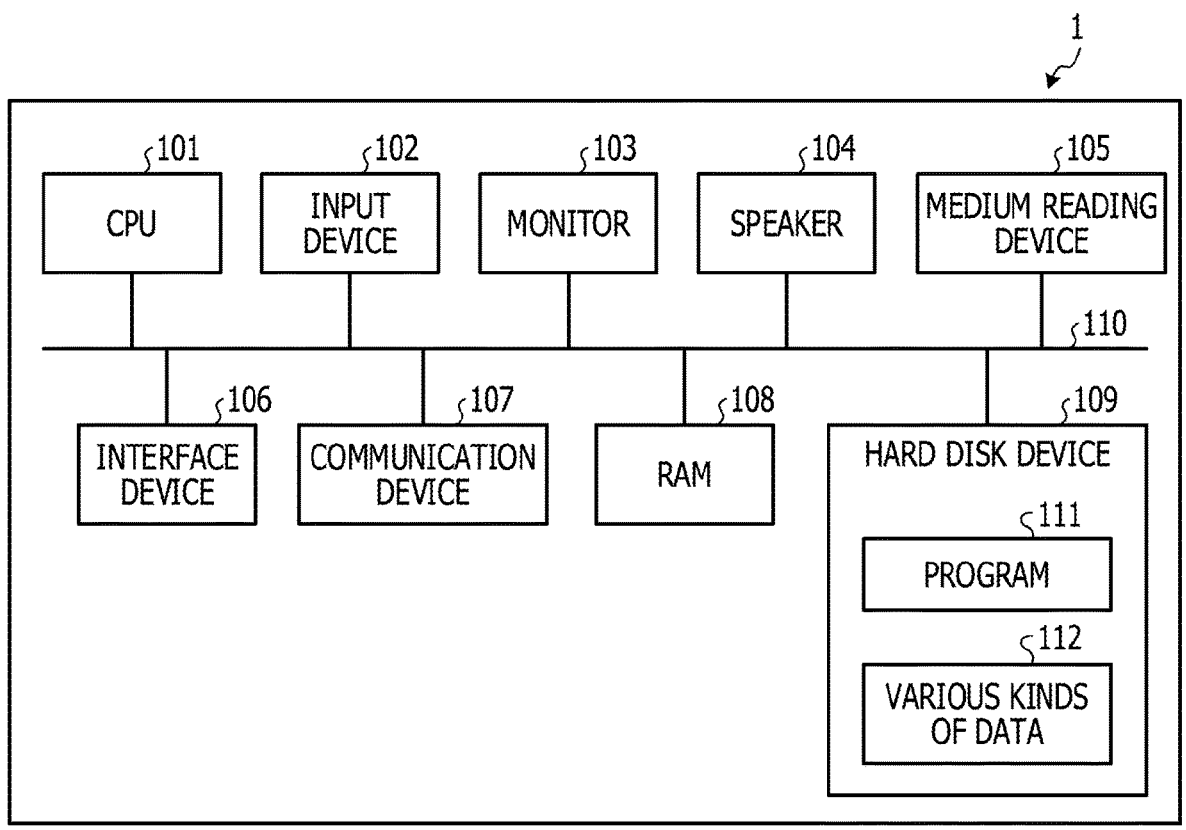
FIG. 14 is a block diagram illustrating an example of the hardware configuration of the detection device according to the embodiment.

Incidentally, it is possible to realize the various kinds of processing described in the embodiments described above by executing a program provided in advance on a computer. Thus, in the following, a description will be given of an example of a computer (hardware) having the same functions as those of the embodiments described above. FIG. 14 is a block diagram illustrating an example of the hardware configuration of the detection device 1 according to the embodiment. A description will be given of an example of the hardware configuration illustrated in FIG. 14 as an example of a computer using the detection device 1 as a representative. However, it goes without saying that the hardware configuration is the same for the terminal devices 1*a*, 1*b*, and 1*d* and the server device 1*c*, and the like.

As illustrated in FIG. 14, the detection device 1 includes a CPU 101 that performs various kinds of operation processing, an input device 102 that receives data input, a monitor 103, and a speaker 104. The detection device 1 includes a reading device 105 that reads a program, and the like from a storage medium, an interface device 106 for connecting various devices, and a communication device 107 to have a wired or wireless communication connection with an external device. The detection device 1 includes a RAM 108 for temporarily storing various kinds of information and a hard disk device 109. Each unit (101 to 109) in the detection device 1 is connected to a bus 110.

The hard disk device 109 stores a program 111 for executing the various kinds of processing described in the embodiment described above. The hard disk device 109 stores various kinds of data 112 referenced by the program 111. The input device 102 receives, for example, input of operation information from an operator. The monitor 103 displays, for example, various screens operated by the operator. The interface device 106 is connected to, for example, a printer, or the like. The communication device 107 is connected to a communication network, such as a LAN (Local Area Network), or the like and exchanges various kinds of information with an external device via a communication network.

The CPU 101 reads the program 111 stored in the hard disk device 109, loads the program into the RAM 108, and executes the program so as to preform various kinds of processing. By executing the program 111, the CPU 101 functions, for example, the background detection units 10, 10*a*, 10*b*, and 10*c*, the background difference processing unit 20, the face detection unit 21, the motion calculation unit 22, the nodding detection unit 23, the reception quality evaluation unit 24, the data processing unit 25, the output unit 26, the vibration instruction unit 27, the image correction unit 29, the user input unit 32, the camera operation input unit 33, the feedback unit 34, and the like. The program 111 may not be stored in the hard disk device 109. For example, the detection device 1 may read the program 111 stored in a readable storage medium and executes the program 111. The storage medium readable by the detection device 1 is supported by, for example, a portable recording medium, such as a CD-ROM, a DVD disc, a USB (Universal Serial Bus) memory, or the like, a semiconductor memory, such as a flash memory, or the like, a hard disk drive, or the like. The program 111 may be stored in a device connected to a public line, the Internet, a LAN, or the like, and the detection device 1 may read the program 111 from these and execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and the processor configured to execute a process, the process including:
   extracting a moving object area corresponding to a moving object included in a plurality of frames in a moving image based on a result of a comparison between the plurality of frames with each other;
   tracking a position of the moving object area among the plurality of frames;
   determining, for each of the plurality of frames, an image area excluding the moving object area whose position moves more than a defined period of time to be a background area; and
   updating a background image of the moving image based on a result of the determining.

2. The information processing apparatus according to claim 1, wherein
   the determining determines an image area excluding a specified moving object area, in the moving object area, having a position moved over a predetermined number of frames to be the background area.

3. The information processing apparatus according to claim 1, wherein the process further comprises:
   storing, in the memory, a background image detected up to a preceding frame of a predetermined frame of the moving image; and wherein
   the updating includes:
   multiplying a pixel value in the background area determined for the predetermined frame by a predetermined value; and
   adding a product thereof to the stored background image so as to update a background image corresponding to the predetermined frame.

4. The information processing apparatus according to claim 3, wherein the process further comprises:
   calculating a background degree of the moving object area based on the number of the frames which the position of the moving object changes; and wherein
   the updating includes:
   multiplying a pixel value in the background area determined for the predetermined frame by the calculated background degree; and
   adding a product thereof to the stored background image so as to update a background image corresponding to the predetermined frame.

5. The information processing apparatus according to claim 1, wherein the process further comprises:
   detecting a moving object image corresponding to a moving object included in each of the plurality of frames based on a difference between the background image and each of the plurality of frames.

6. The information processing apparatus according to claim 5, wherein the process further comprises:
   evaluating a movement of the moving object based on the moving object image detected from each of the plurality of frames.

7. The information processing apparatus according to claim 6, wherein the process further comprises:
   receiving an operation input related to a camera that captures the moving image; and
   correcting the moving image so as to cancel the operation input; and wherein the evaluating evaluates the motion of the moving object based on the moving object image detected from each of a plurality of frames in the corrected moving image.

8. The information processing apparatus according to claim 6, wherein the process further comprises:

detecting a movement of a camera that captured the moving image; and correcting a displacement with the motion of the camera of the background area in each of the plurality of frames based on the detected motion of the camera.

9. A background image update method executed by a computer, the background image update method comprising:

extracting a moving object area corresponding to a moving object included in a plurality of frames in a moving image based on a result of a comparison between the plurality of frames with each other;

tracking a position of the moving object area among the plurality of frames;

determining, for each of the plurality of frames, an image area excluding the moving object area whose position moves more than a defined period of time to be a background area; and updating a background image of the moving image based on a result of the determining.

10. A non-transitory computer-readable storage medium storing a program that causes a computer to execute a process, the process comprising:

extracting a moving object area corresponding to a moving object included in a plurality of frames in a moving image based on a result of a comparison between the plurality of frames with each other;

tracking a position of the moving object area among the plurality of frames;

determining, for each of the plurality of frames, an image area excluding the moving object area whose location moves more than a defined period of time to be a background area; and updating a background image of the moving image based on a result of the determining.

* * * * *